United States Patent
Bolgiani et al.

(10) Patent No.: US 7,659,690 B2
(45) Date of Patent: Feb. 9, 2010

(54) VEHICULAR BATTERY CHARGING METHOD

(75) Inventors: Giovanni Bolgiani, Rochester, MI (US); Lawrence J. Oswald, Bloomfield Hills, MI (US); David H. Swan, Lawrencetown (CA)

(73) Assignee: Chrysler Group LLC, Auburn Hills, MI (US)

( * ) Notice: Subject to any disclaimer, the term of this patent is extended or adjusted under 35 U.S.C. 154(b) by 282 days.

(21) Appl. No.: 11/428,682

(22) Filed: Jul. 5, 2006

(65) Prior Publication Data

US 2008/0007220 A1    Jan. 10, 2008

(51) Int. Cl.
*H02J 7/14* (2006.01)
*H02J 7/00* (2006.01)
*H02J 7/04* (2006.01)

(52) U.S. Cl. .................. 320/104; 320/160; 320/161; 320/162; 320/155; 320/157

(58) Field of Classification Search ............... 320/104, 320/114, 116, 139, 148, 125, 160, 155, 161, 320/162, 164
See application file for complete search history.

(56) References Cited

U.S. PATENT DOCUMENTS

| 6,710,575 B2 | 3/2004 | Youn |
| 6,731,096 B1 | 5/2004 | Patino et al. |
| 6,841,972 B2 * | 1/2005 | Koo ..................... 320/132 |

* cited by examiner

*Primary Examiner*—Edward Tso
*Assistant Examiner*—Alexis Boateng
(74) *Attorney, Agent, or Firm*—Ralph E. Smith (57) ABSTRACT

A method for charging a battery pack for an electric vehicle charges at a preselected maximum charging current until the battery pack voltage reaches a reference voltage level. The battery pack is then charged while maintaining the reference voltage until the charging current decreases to a first reference current level. Charging continues at the first reference current level until a time rate of change of the battery pack voltage reaches a first reference time rate of change. The battery pack voltage is determined and whenever the battery pack voltage is less than a decision voltage reference level, the battery pack is further charged at a second reference current level until the time rate of change of the battery pack voltage reaches a second reference value. A manually initiated pack recovery charge routine is also provided to address new battery pack installations.

18 Claims, 9 Drawing Sheets

FIG. 9 ations occur.
VEHICULAR BATTERY CHARGING METHOD

BACKGROUND

The invention relates generally to battery charging methods. More specifically, the invention concerns a charging method for the battery pack of an electric vehicle.

A known charging method for the batteries of electric vehicles utilizes three basic steps. The first step, with reference to the flow chart of FIG. 1, charges the battery pack to full power until a reference voltage (which may be temperature compensated) is reached, as shown in steps 102, 104, 106, 108 and 110 of FIG. 1.

Figure 1:
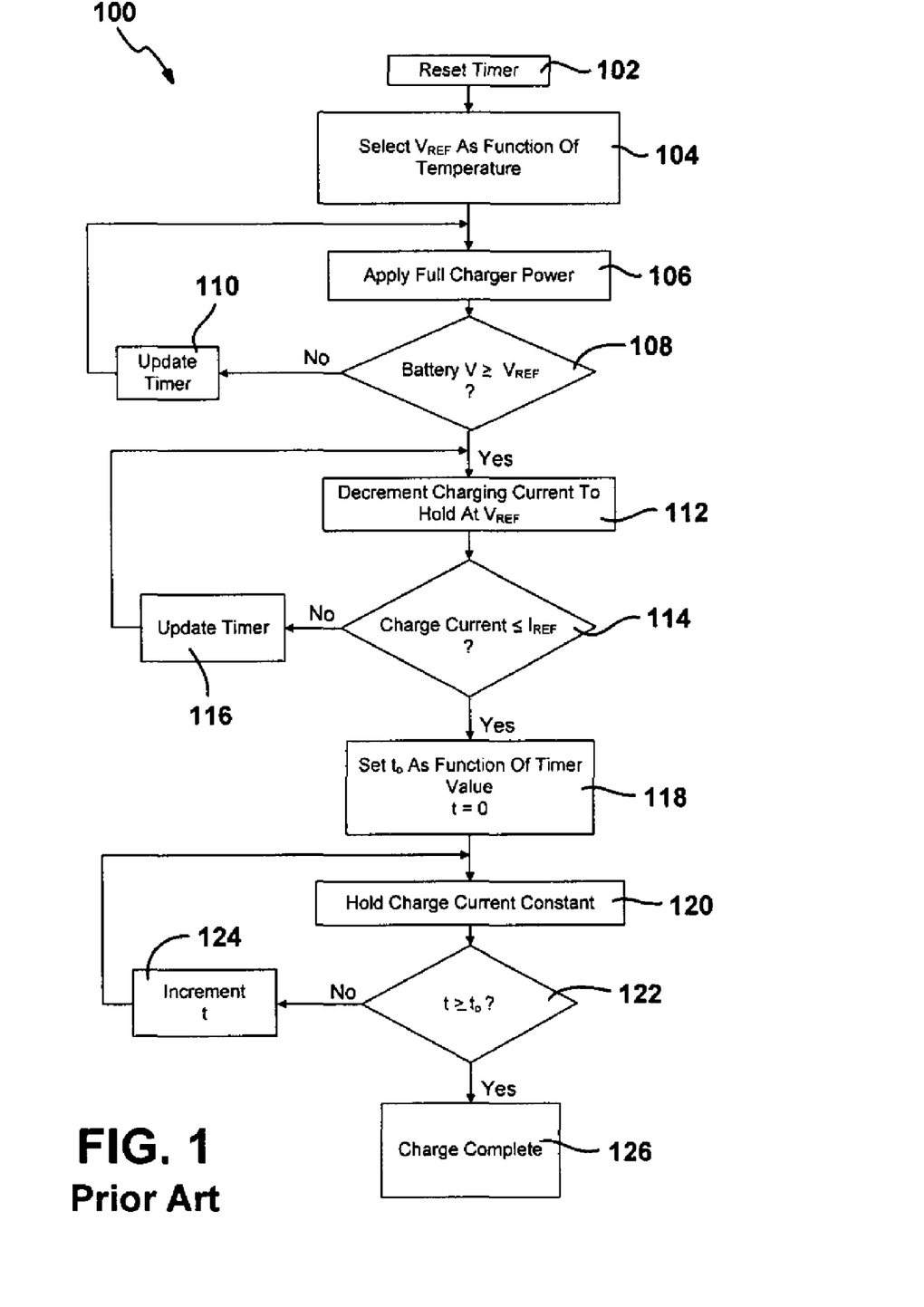
FIG. 1 is a flow chart of a known battery charging method.

In a second step, charging continues holding the voltage at the reference voltage as the charging current decreases over time, as seen in steps 112, 114, 116 of FIG. 1.

In a third step, charging is carried out at a constant current with charging complete determined as a function of a time value determined by the time spent in the first two steps, as seen from steps 118, 120, 122, 124 and 126 of FIG. 1.

This known method performs satisfactorily when the vehicle batteries are in daily use, but is unacceptable for long periods (e.g., two weeks or more) of vehicle non-use. Furthermore, the known method has no capability for recovering a vehicular battery pack from a deep discharge.

Therefore, there is seen to be need in the art for a vehicular battery charging method capable of maintaining a desired vehicle operating range, increasing battery pack life and recovering from a long non-usage period or deep discharge.

SUMMARY OF THE INVENTION

A method for charging a battery pack having at least one battery for a vehicle begins by determining a battery pack reference voltage. The battery pack is charged at a preselected maximum charging current until battery pack voltage reaches the battery pack reference voltage. The battery pack is then charged while maintaining the battery pack reference voltage until charging current decreases to a first preselected charging current reference level. Charging continues at the first charging current reference level for a first preselected minimum time period, and then the charging continues until a time rate of change of battery pack voltage reaches a first preselected reference time rate of change. The battery pack voltage is then determined and whenever the battery pack voltage is less than a preselected decision voltage, the battery pack is charged at a second preselected charging current reference level for a second preselected minimum time period and then continues charging until a time rate of change of the battery pack voltage reaches a second preselected reference time rate of change.

BRIEF DESCRIPTION OF THE DRAWING

The objects and features of the invention will become apparent from a reading of a detailed description, taken in conjunction with the drawing, in which.

DETAILED DESCRIPTION

Figure 2:
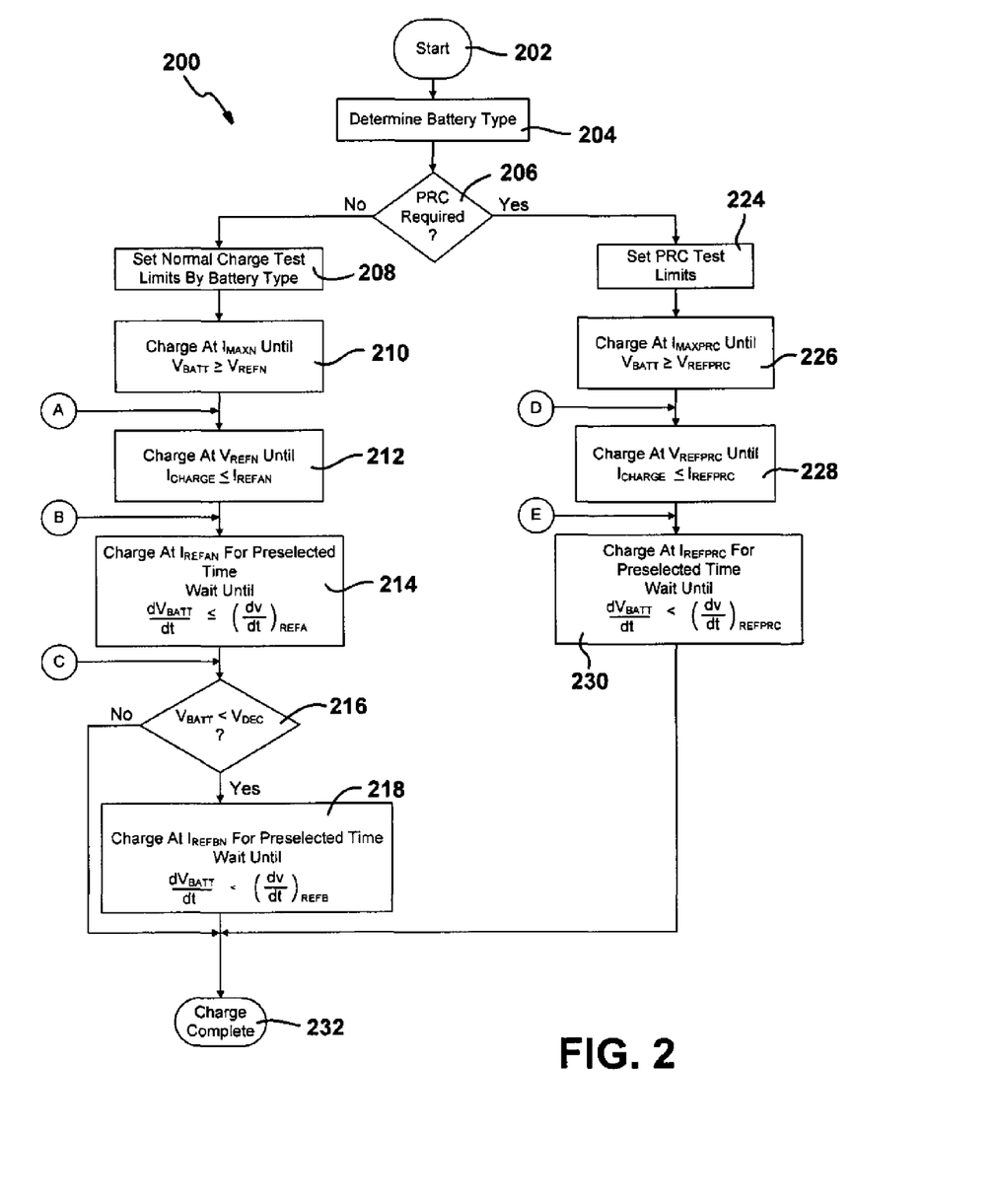
FIG. 2 is a flow chart of a battery charging method according to the principles of the invention.

With reference to FIG. 2, a charging method is flow charted in accordance with the principles of the invention. Unlike the known method of FIG. 1, this method adds a fourth step in a four step approach where step terminations are based not only on a temperature compensated battery reference level but on time rate of change of the battery voltage and individual step time limits.

The first step utilizes maximum rated charging current until the battery pack reaches a preselected reference value. During step one the bulk of the battery pack charging occurs at a relatively high rate.

The second step is a transitionary step starting at the maximum charging current and allowing the charging current to decrease to a preselected reference level while the voltage holds at its preselected reference level. At the end of this step, the majority of the discharged ampere hours of the battery pack will have been restored.

The third step is an over-charge step to ensure that the battery pack is fully charged. During this step, a transition from storage related to non-storage related chemical reactions occur.

The fourth step of the inventive method is a discretionary step that provides additional over-charge to balance the battery pack modules and recover pack capacity. The fourth step is initiated as a function of how the preceding step terminated.

The method starts at step 202 and then proceeds to step 204 wherein the battery type is determined. Exemplary battery types are either a flooded water based battery cell or a gel-type cell. However, it should be noted that there are other types based on other battery characteristics.

The method then proceeds to decision block 206 where it is determined if a pack recovery charge is required. The pack recovery charge (PRC) is manually initiated by a service technician and is usually required as a result of a new battery pack or inability to charge due to low voltage fault, or low battery pack capacity.

If a normal charge sequence, rather than a PRC is required, the method proceeds to step 208 where normal charge test limits are preselected by battery type. At step 210 (step one of the normal charging method generally described above) the battery pack is charged at a maximum normal current $I_{MAXN}$ until the battery voltage is greater than or equal to the preselected battery reference level $V_{REFN}$. $V_{REFN}$ may be temperature compensated, based on the battery type.

The next step in charging takes place at step 212 (step two of the normal charging method generally described above) where the battery pack is charged at a constant reference level $V_{REFN}$ until the charge current decreases to a level less than or equal to a first reference level for normal charging, $I_{REFAN}$.

At step 214 (step three of the normal charging method generally described above), the battery is charged at the first reference current level for a preselected minimum time. Charging then continues until the time rate of change of the battery voltage is less than or equal to a first reference time rate of change.

At step 216, the battery voltage is determined, and if it is less than a decision voltage $V_{DEC}$, then the fourth step commences at step 218, wherein the battery is charged at a second reference level $I_{REFBN}$ for a preselected minimum time. The charging then continues until the time rate of change of the battery voltage is less than or equal to a second time rate of change reference level. Then charging without a fault is complete and the method proceeds directly to charge complete step 232.

At decision block 216, if the battery voltage is greater than or equal to the decision voltage, then charging without a fault condition is complete and the method proceeds directly to step 232.

Returning to decision block 206, if PRC is required, the method proceeds to step 224 wherein test limits for a pack recovery charge sequence are preselected. At step 226, the battery is charged at a maximum PRC reference level until the battery voltage is greater than or equal to a PRC reference level. At step 228 the battery is charged at the PRC voltage reference until the charge current decreases to a reference PRC current level. At step 230 the battery is charged at the PRC current reference level for a preselected time. The charging then continues until the time rate of change of the battery voltage is less than or equal to a PRC reference time rate of change level. The PRC charging routine then proceeds to step 232 as an indication of successful charging completion with no faults.

Hence it will be seen from FIG. 2 that the PRC basically comprises three steps 226, 228 and 230 which are essentially respectively similar to steps 210, 212 and 214 of the normal charge routine, except for use of a reference voltage $V_{REFPRC}$ greater than reference voltage $V_{REFN}$ and a "preselected time" in step 230 which is greater than the "preselected time" in step 214. Any ending of the PRC automatically reverts back to a normal charge setting. Possible endings of PRC include charge unplugged indication, charge termination due to fault, and successfully completed PRC.

Figure 3:
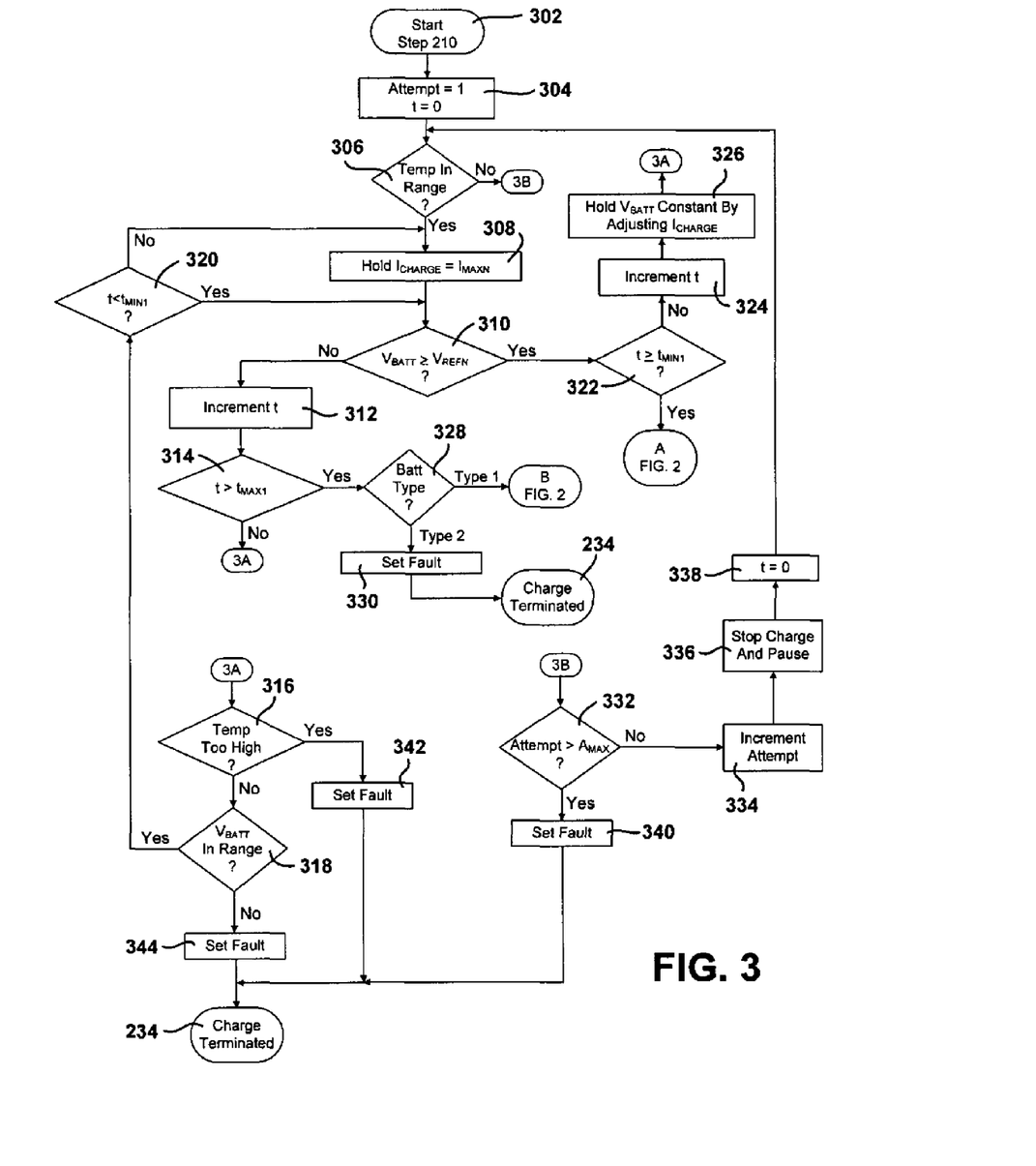
FIG. 3 is a flow chart setting forth details of step 210 of FIG. 2.

With reference to FIG. 3, the details of step 210 of FIG. 2 are set forth in more detail. Step 210 begins at 302 and proceeds to 304 where a number of attempts is initialized to one and the step timer is initialized to zero. At step 306, the battery temperature is checked at decision block 306 to determine whether it lies within an acceptable range. If the battery temperature is acceptable, battery charging commences at step 308 at a constant current equal to maximum charge level $I_{MAXN}$, and the method proceeds to decision block 310.

Returning to decision block 306, if the battery temperature is not in range, then at point 3B of FIG. 3, the number of charging attempts is compared to an allowable maximum number of attempts, $A_{MAX}$, in decision block 332. If the maximum number of attempts have been exceeded, then an appropriate fault is set at block 340, and charging is terminated at 234.

If the number of attempts has not exceeded $A_{MAX}$, then the number of attempts is incremented at step 334, charging ceases for a preselected pause interval at step 336, the step time is reset to zero at 338, and the method then proceeds back to decision block 306 for re-start of charging, if the battery temperature is now in range.

The retry charging attempts of step 210 address the condition of the charger being connected while the battery temperature is out of range. Stopping the charge attempt, pausing for a preselected time interval, and then restarting step 210 allows the battery pack time to cool down or heat up so as to be within a required acceptable temperature range.

At decision block 310, the battery voltage is determined and if it is greater than or equal to a normal charge reference voltage $V_{REFN}$ (which may or may not be temperature compensated based on the battery type), then the method proceeds to decision block 322.

At decision block 322, if the step time is equal to or greater than a minimum step time $t_{MIN1}$, then the method proceeds to phase 2 of the overall normal charging method at entry point A of FIG. 2.

If the step time is less than $t_{MIN1}$, the step time is incremented at block 324, the battery voltage is held constant by adjusting the charging current $I_{CHARGE}$, and the routine goes to point 3A of FIG. 3 to check for temperature and voltage faults as described below. The purpose of the minimum charging time is to allow a highly discharged battery pack to receive at least some charging current at $V_{REFN}$ resulting in a lower internal battery pack resistance and increased charge acceptance. Without provision of $t_{MIN1}$, the method could proceed too quickly to step 2 (box 212 of FIG. 2) without sufficient bulk charging.

If the battery voltage is less than the reference voltage at decision block 310, the step timer is incremented at step 312, and the step time is checked against a first maximum reference level $t_{MAX1}$ at step 314. If the step time has not exceeded the maximum value, $t_{MAX1}$, then the routine proceeds to point 3A of FIG. 3, where the battery pack temperature is checked at decision block 316. If the battery temperature is not too high, then the method proceeds to decision block 318 wherein the battery voltage is compared to a preselected acceptability range. If the battery voltage is within the preselected range, then the routine returns to step 308, if the step time is greater than or equal to $t_{MIN1}$ continuing the charge at the maximum charging current reference level. If the step time is less than $t_{MIN1}$ at decision block 320, the routine returns to step 310.

If the battery is not in range at step 318, then a battery out-of-range fault condition is set at 344, and charging stops at 234 indicating a charge termination due to a battery voltage level fault.

Returning to decision block 316, if the temperature is determined to be too high, then the routine sets a high temperature fault condition at block 342, and charging is terminated at 234.

Returning to decision block 314, if the step time has exceeded the first reference level $t_{MAX1}$, then at step 328 the battery type determines whether or not the charge will be terminated. If the battery is of a type that the charging should be continued even though the timeout period has elapsed, the routine proceeds to entry point B of FIG. 2, which basically means that the second phase of the method of FIG. 2 (i.e., step 212) will be skipped under this condition. If the battery type is of a type wherein charging should not continue for longer than $t_{MAX1}$, then a time out fault condition is set at 330, and the charge routine is terminated at 234.

Figure 4:
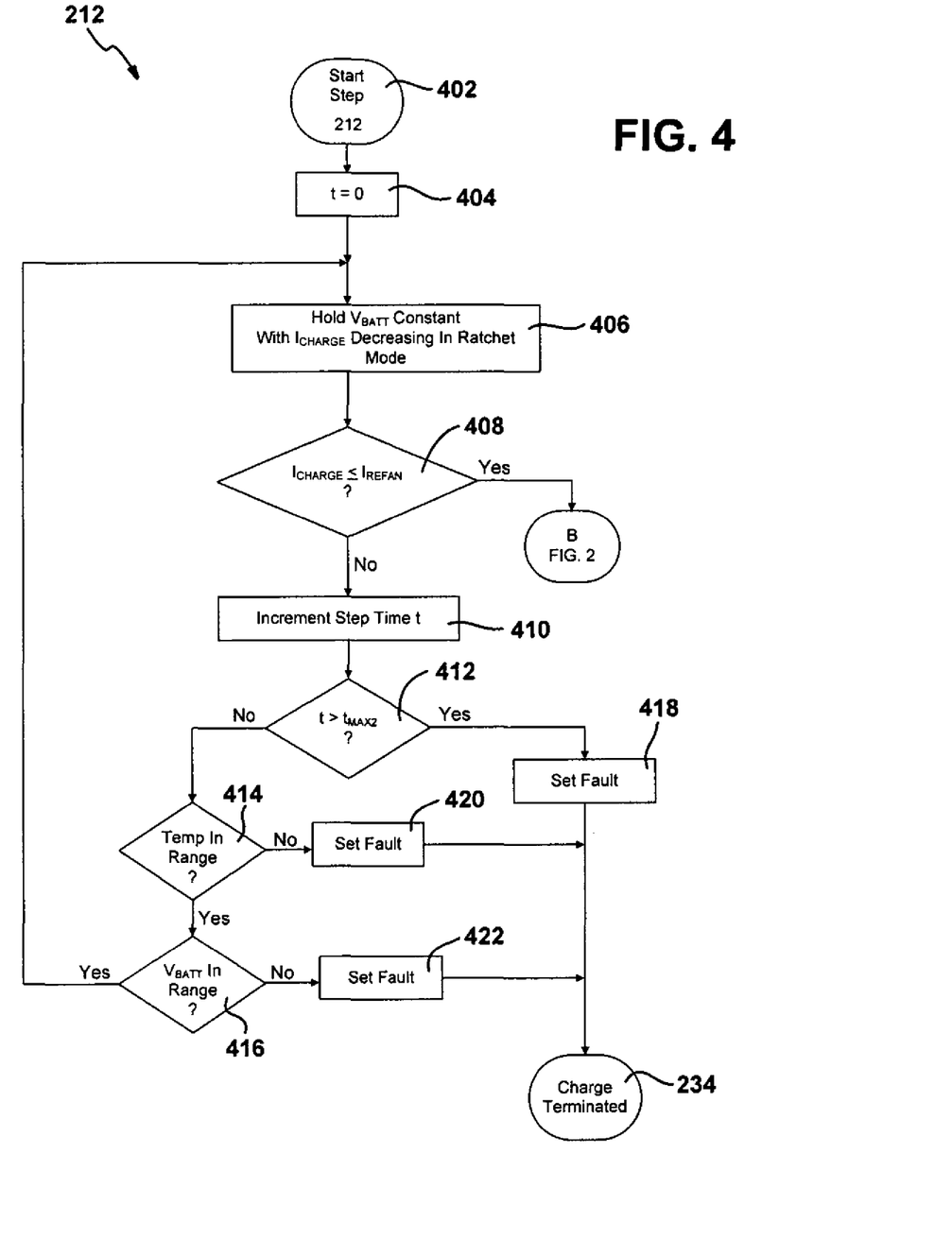
FIG. 4 is a flow chart setting forth details of step 212 of FIG. 2.

The details of the second phase of the method of FIG. 2, step 212, is set forth in the flow chart of FIG. 4. Step 212 begins at 402 and proceeds to block 404 where the step timer is initialized to zero. At step 406 the battery pack is charged while holding the battery voltage constant as the charging current decreases. During step 406, $I_{CHARGE}$ is only allowed to decrease. Once $I_{CHARGE}$ has dropped, it will not be increased even if the battery pack voltage $V_{BATT}$ drops below the reference level $V_{REFN}$ reached at the conclusion of step one. This current ratcheting feature reduces the possibility of battery thermal runaway. The step two maximum time limit $t_{MAX2}$ creates a method of terminating step 2 charging when the current ratchet is being utilized.

At decision block 408, the charge current is compared to a first reference level $I_{REFAN}$ for a normal charging sequence. If the charging current has decreased to the first reference level, then the charging in this step is complete and the method proceeds to entry point B, or the third phase, of the method of FIG. 2.

If the charging current has not decreased to the first reference level, then the step timer is incremented and a test at 412 for the step time versus a preselected second step maximum time $t_{MAX2}$ is conducted. If the step time exceeds a second maximum reference level, then a timeout fault condition is set at 418 and the charging is terminated at 234.

If the step time has not exceeded the allowable maximum at test 412, then the routine proceeds to decision block 414 where the battery pack temperature is compared to an allowable range. If the battery pack temperature is within the allowable range, then the battery voltage is compared to an allowable range at decision block 416. If the battery voltage and the temperature are in range, then the routine proceeds back to step 406 where charging continues at constant voltage with charge current decreasing or ratcheted.

If the temperature is not in range, then an out of temperature range fault condition is set at 420 and charging is terminated at 234. If the battery is out of range at step 416, then a battery out of range fault condition is set at 422 and the charging is terminated at 234.

Figure 5:
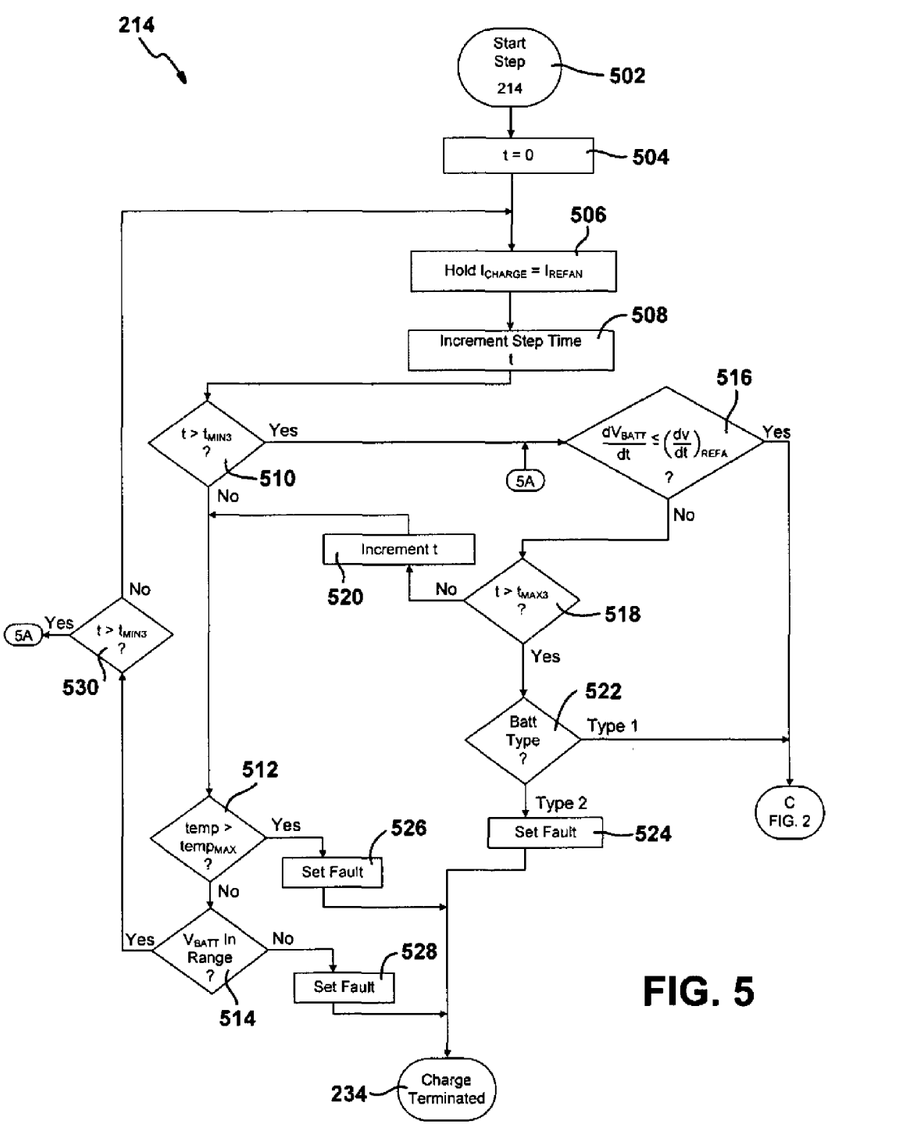
FIG. 5 is a flow chart setting forth details of step 214 of FIG. 2.

Details of the third phase of charging of the method of FIG. 2 are set forth in the flow chart of FIG. 5. Step 214 begins at element 502 and proceeds to step 504 where the step timer is initialized to zero. At step 506 the battery pack is charged at a constant charging current reference level $I_{REFAN}$ for a normal charge sequence.

At step 508 the step timer is incremented and at decision block 510 the step time is compared to a preselected minimum time interval $t_{MIN3}$. If $t_{MIN3}$ has not been exceeded, then the routine proceeds to decision block 512 where the battery pack temperature is compared to a preselected maximum allowable temperature. If the battery pack temperature is not exceeding the preselected maximum, then the routine proceeds to decision block 514 where the battery pack voltage is compared against an acceptable range. If the battery pack voltage and temperature are both within their acceptable norms, the routine proceeds to decision block 530 where the step time is again compared to $t_{min3}$. If the step time has not exceeded $t_{min3}$, then the routine proceeds back to step 506 where charging continues at the first reference current level. If $t_{min3}$ has been exceeded, the routine proceeds to decision block 516.

Returning to decision blocks 512 and 514, if the temperature or voltage of the battery pack is out of range, then either a temperature fault condition at 526 or a battery voltage fault condition at 528 is set and charging is terminated at 234.

Returning to decision block 510, if the step time has exceeded the preselected minimum $t_{min3}$ then at decision block 516 the time rate of change of the battery pack voltage is compared to a first reference time rate of change. If the battery pack voltage time rate of change is less than the reference, then the routine proceeds to entry point C of FIG. 2, or phase 4 of the overall method of FIG. 2.

If the time rate of change of the battery pack is greater than the reference level then the routine proceeds to decision block 518 wherein the step time is compared to a maximum allowable time $t_{MAX3}$. If the maximum time for the step has not been exceeded, then the timer is incremented at 520 and the routine returns to decision block 512. If the step time has exceeded the allowable maximum at step 518, then for those batteries where further charging is not permitted (type 2), a fault condition for a timeout is set at 524 and charging is terminated at 234.

For those batteries capable of sustaining further charging at step 522 (or type 1), the routine proceeds to entry point C of FIG. 2 which is the beginning of phase 4 of the method.

Figure 6:
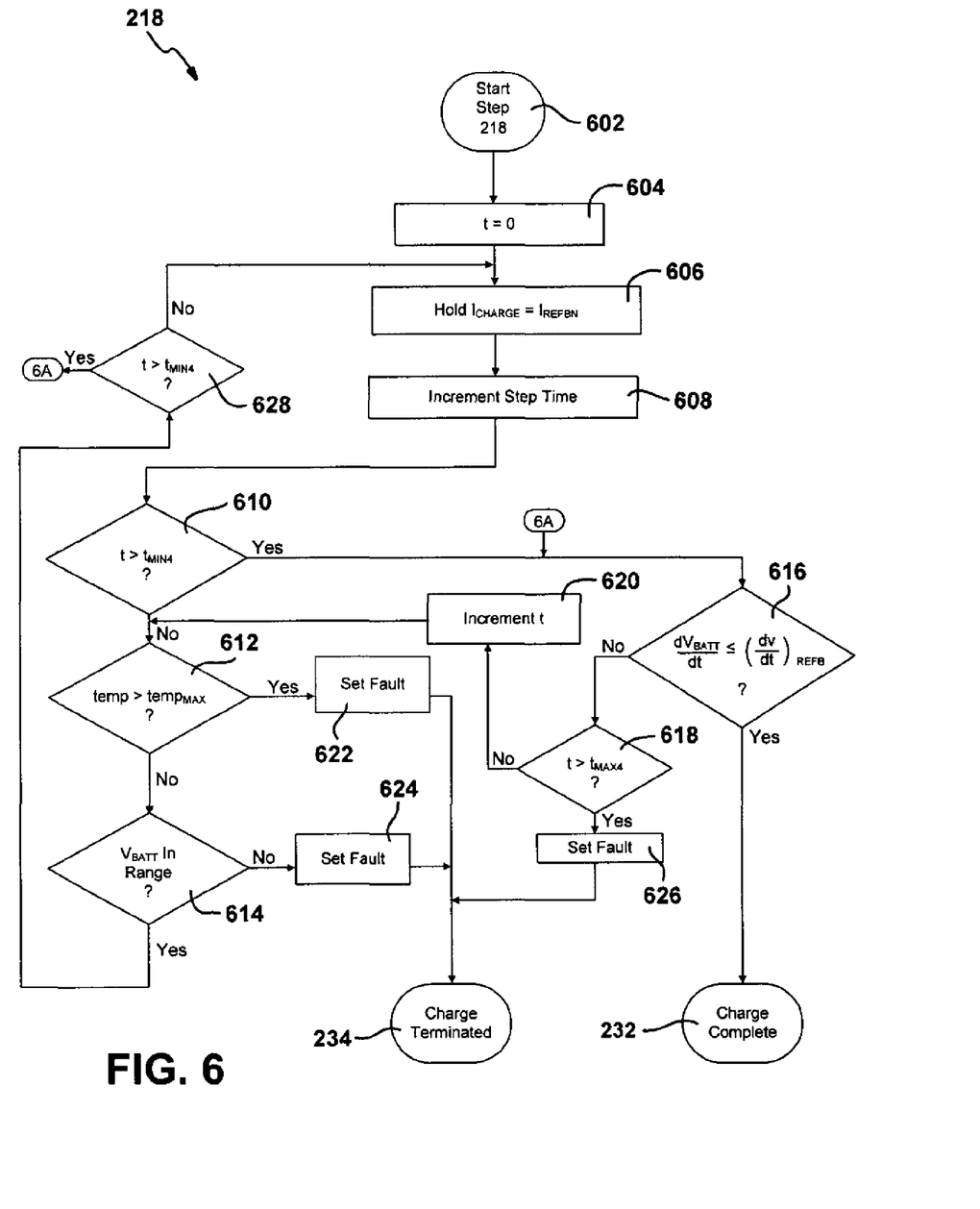
FIG. 6 is a flow chart setting forth details of step 218 of FIG. 2.

Details of the final phase 4 of the normal charging routine are set forth in the flow chart of FIG. 6. Step 218 begins at 602 and proceeds to step 604 where the step timer is initialized to zero. At step 606 charging current is held at a second reference level $I_{REFBN}$ for the normal charging sequence.

At step 608 the timer for the step is incremented and at decision block 610 the step time is compared to a preselected minimum $t_{MIN4}$. If the time has not exceeded the preselected minimum, the routine proceeds to decision block 612 where the temperature is compared to an allowable maximum battery pack temperature. If the temperature does not exceed the allowed maximum, then the battery pack voltage is compared against an acceptable range at decision block 614. If the battery is in range, the routine then proceeds to decision block 628 where the step time is again compared to $t_{MIN4}$. If the step time is less than or equal to $t_{MIN4}$, then the routine returns to step 606 where the charging current is continued at the second reference level. If the step time is greater than $t_{MIN4}$, the routine proceeds to decision block 616.

If the temperature or voltage of the battery pack is out of allowable tolerances, then appropriate fault conditions are set at step 622 or step 624, and charging is terminated at 234.

Returning to decision block 610, if the step time exceeds the preselected minimum, then the routine proceeds to decision block 616 where the time rate of change of the battery pack voltage is compared to a second reference time rate of change level.

If the time rate of change of the battery pack is less than or equal to the second reference, then charging is complete without fault at 232.

If the time rate of change of the battery pack is greater than the second reference level, then the routine proceeds to decision block 618. At 618, the step time is compared to a preselected maximum $t_{MAX4}$. If the step time has not exceeded the allowable maximum, the timer for the step is incremented at 620 and the routine returns to decision block 612.

If the step time exceeds the allowable maximum, then a time out fault condition is set at 626, and charging is terminated at 234.

Figure 7:
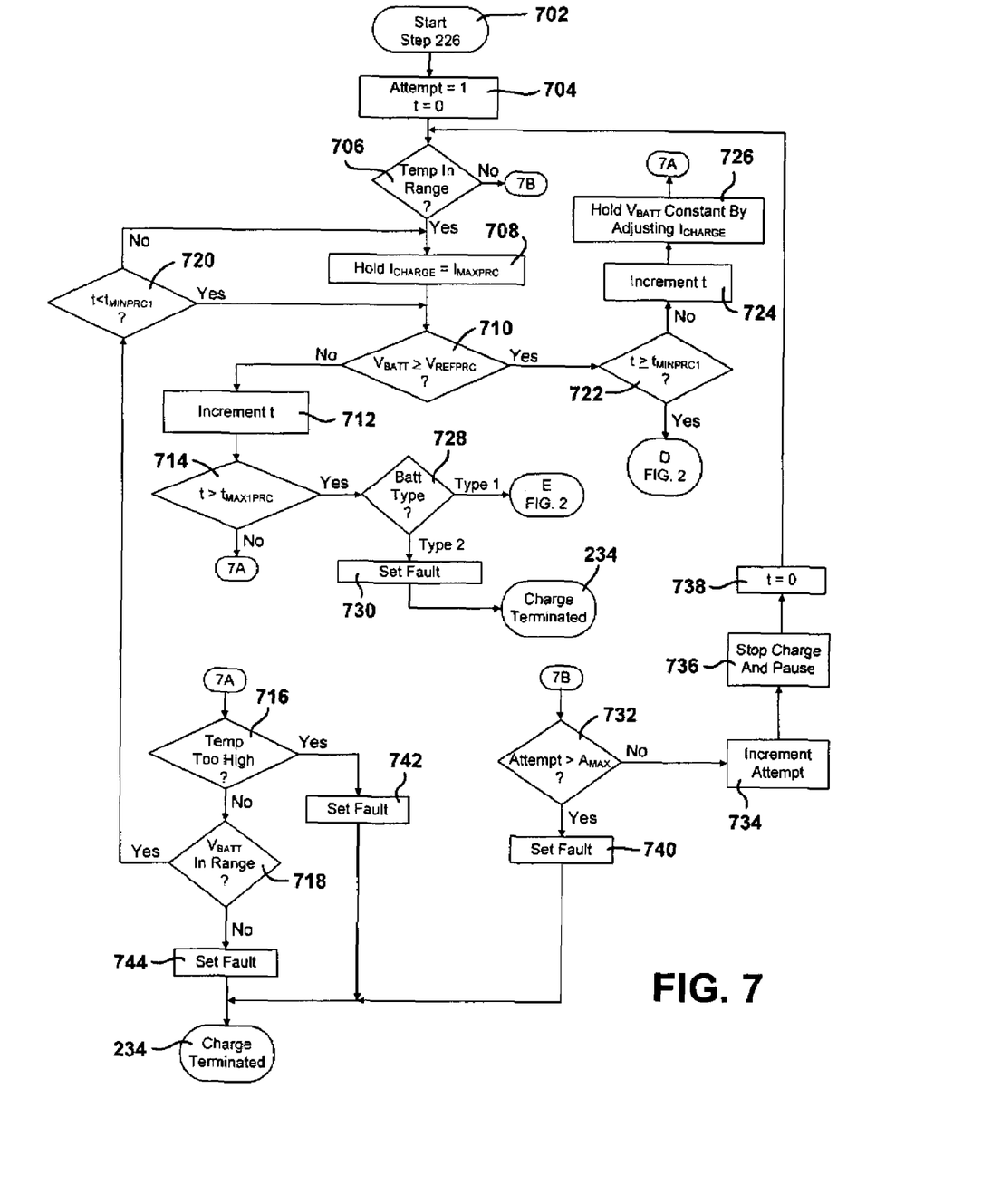
FIG. 7 is a flow chart setting forth details of step 226 of FIG. 2.

The details of step 226 in the pack recovery charge routine of FIG. 2 are set forth in the flow chart of FIG. 7. Step 226 begins at 702 and proceeds to step 704 where the number of attempts of this step are initialized to 1 and the step timer is set to zero. At decision block 706, the battery temperature is checked. If the battery temperature is not within an acceptable range, the routine goes to point 7B of FIG. 7. If the battery temperature is within the acceptable range, the routine proceeds to step 708.

At step 708 the battery pack is charged at a constant maximum PRC reference level, $I_{MAXPRC}$, and the routine then proceeds to decision block 710. If the battery pack voltage is greater than or equal to a reference PRC value, $V_{REFPRC}$, then the method proceeds to decision block 722 where the step time is compared to a preselected minimum step time $t_{MINPRC1}$. If the minimum has been exceeded, the overall PRC routine of FIG. 2 is entered at point D. If the minimum step time has not been exceeded, then the step time is incremented at block 724, the battery voltage is held constant by adjusting the charge current at block 726, and the routine proceeds to point 7A of FIG. 7.

If the battery pack voltage has not reached the reference PRC decision level, $V_{REFPRC}$, then the routine proceeds to 712 where the step timer is incremented. At decision block 714, the step time is compared to a preselected maximum for a PRC, $t_{MAX1PRC}$. If the step time has exceeded the preselected maximum, then the charging routine proceeds to decision block 728. If the step time has not exceeded the preselected maximum, the method proceeds to point 7A of FIG. 7 where the battery pack temperature is compared to an acceptable maximum at decision block 716. If the temperature is not too high, then the battery pack voltage is compared to an acceptable range at decision block 718. If the battery voltage and temperature are within range, then, if the step time is greater than or equal to $t_{MINPRC1}$ at decision block 720, the routine proceeds back to step 708 where charging at the PRC maximum current level continues. If the step time is less than $t_{MINPRC1}$, the routine proceeds to decision block 710. Returning to decision block 718, if the battery voltage is not within the acceptable range, then a voltage fault condition is set at 744, and the charging terminates at 234.

Returning to decision block 706, if the battery pack temperature is not within the acceptable range, then the method proceeds to point 7B of FIG. 7 where the number of attempts of this step are compared at decision block 732 to a preselected allowable maximum number of attempts $A_{MAX}$. If the attempts are greater than the preselected maximum, then an appropriate fault condition is set at 740, and the charge terminates at 234.

Returning to decision block 732, if the attempt is less than the maximum allowable, then the routine increments the number of attempts at 734 and charging stops for a preselected pause interval at 736. The step timer is reset to zero at 738, and the routine then returns to step 706.

Returning to decision block 728, if the battery is of a type where no further charging should occur (Type 2), then a time-out fault is set at block 730, and charging is terminated at 234. If the battery is of a type where further charging may be employed (Type 1), then the method proceeds to point E of FIG. 2 where the PRC is continued.

Figure 8:
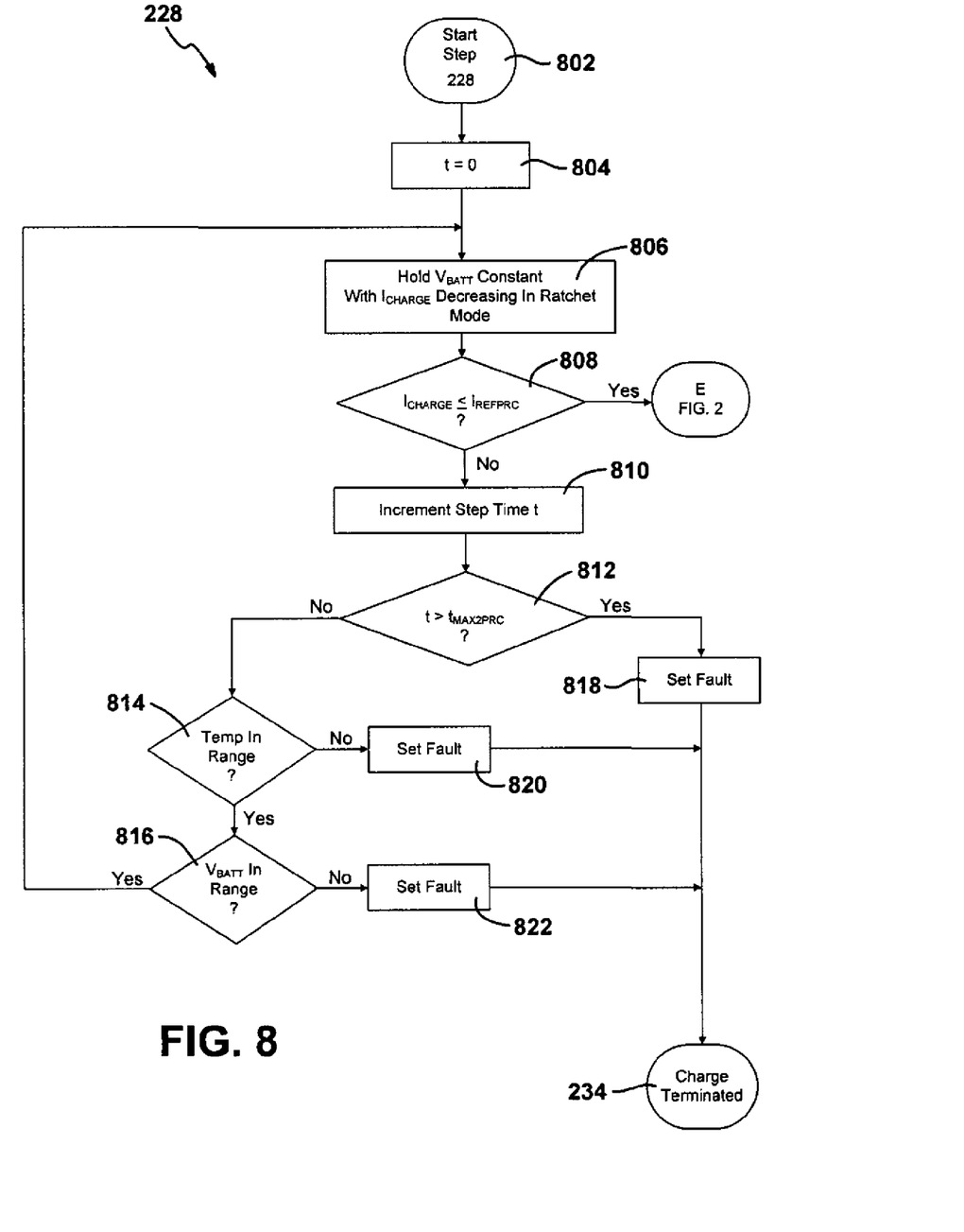
FIG. 8 is a flow chart setting forth details of step 228 of FIG. 2.

The details of step 228 of the PRC charging routine are set forth in the flow chart of FIG. 8. Step 228 begins as 802 and proceeds to step 804 where the step timer is initialized to zero.

At step 806, while holding the battery pack voltage constant, charging continues as the charge current $I_{CHARGE}$ decays. As in step 406 of the normal charge routine, a current ratchet feature is used to inhibit battery thermal runaway.

At decision block 808 if the charging current has decayed to a value less than or equal to a PRC reference level $I_{REFPRC}$, then the routine proceeds to the next step in FIG. 2 at entry point E. If the charge has not decayed to the reference level, then the step timer is incremented at 810 and the time is compared to a second PRC maximum value $t_{MAX2PRC}$ at decision block 812.

If the time of this step has not exceeded the allowable maximum, then the routine proceeds to decision block 814, wherein the battery pack temperature is compared to an acceptable range. If the temperature is in the acceptable range, then the routine proceeds to decision block 816 where the battery pack voltage is compared to an allowable range. If the temperature and voltage of the battery pack are within the normal tolerance levels then the routine returns to step 806 where charging continues.

Returning to decision block 812, if the step time has exceeded the allowable maximum, then a time out fault condition is set at 818, and charging is terminated at 234.

If the temperature or voltage of the battery pack is determined to be out of acceptable tolerance ranges, then an appropriate fault condition is set at 820 or 822, and charging is terminated at 234.

Figure 9:
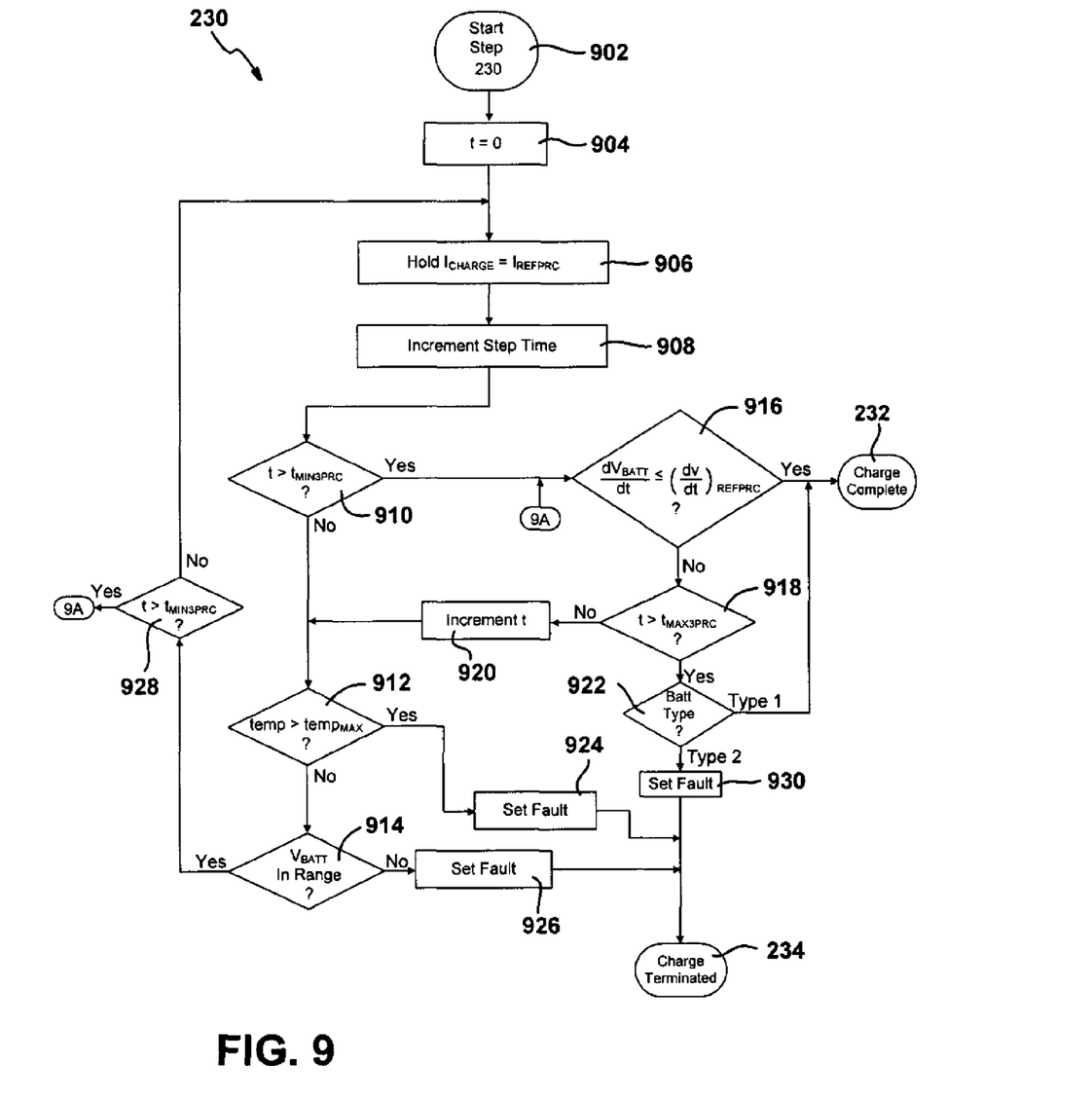
FIG. 9 is a flow chart setting forth details of step 230 of FIG. 2.

The details of step 230 of FIG. 2 are set forth in the flow chart of FIG. 9. Step 230 begins at 902 and proceeds to step 904 where the step timer is initialized to zero.

At step 906 the charging current is held at the PRC reference level and the routine proceeds to 908 where the step time is incremented.

At decision block 910, the step time is compared to a preselected minimum $t_{min3PRC}$. If the step time has not exceeded the minimum, then the routine proceeds to decision block 912 where the battery pack temperature is compared to an acceptable maximum value. If the temperature does not exceed the maximum, then the voltage of the battery pack is compared to an acceptable tolerance range at 914. If the battery and temperature are within acceptable ranges, the routine proceeds to decision block 928 where the step time is again compared to $t_{min3PRC}$. If the step time does not exceed $t_{min3PRC}$, then the routine returns to step 906 where charging at the PRC reference level continues. If the step time exceeds $t_{min3PRC}$, the routine proceeds to decision block 916.

Returning to decision block 910, if the step time has exceeded the preselected minimum then the routine proceeds to decision block 916 where the time rate of change of the battery pack voltage is compared to a PRC reference level.

If the time rate of change of the battery pack voltage is less than or equal to the reference level, then charging is completed without a fault condition at 232.

If the battery pack voltage time rate of change has not decreased to the reference level, then the routine proceeds to decision block 918 where the step time is compared to a preselected PRC maximum, $t_{MAX1PRC}$.

If the step time has not exceeded the maximum, then the timer is incremented and the routine returns to decision block 912.

If the step time has exceeded the allowable maximum, then the routine determines battery type at decision block 922. If the battery is of a type requiring no further charging, e.g. type 1, then the charging is complete at 232. If the battery is type 2, then a fault condition is set at block 930 and charging is terminated at 234.

The invention has been disclosed with reference to a detailed description solely for the sake of example. The scope and spirit of the invention are to be determined in accordance with proper interpretation of the appended claims.

What is claimed is:

1. A method for charging a battery pack comprising at least one battery of a vehicle, the method comprising:
   determining a battery pack reference voltage;
   charging the battery pack at a preselected maximum charging current until battery pack voltage reaches the battery pack reference voltage;
   charging the battery pack while maintaining the battery pack reference voltage until charging current decreases to a first preselected charging current reference level;
   charging the battery pack at the first charging current reference level for a first preselected minimum time period and then continuing charging until a time rate of change of battery pack voltage reaches a first preselected reference time rate of change;
   determining battery pack voltage; and
   whenever the battery pack voltage is less than a preselected decision voltage, charging the battery pack at a second preselected charging current reference level for a second preselected minimum time period and then continuing charging until a time rate of change of the battery pack voltage reaches a second preselected reference time rate of change.

2. The method of claim 1 further comprising completing battery pack charging whenever the battery pack voltage is equal to or greater than the preselected decision voltage.

3. The method of claim 1 further comprising terminating battery pack charging whenever a duration of charging the battery pack exceeds a preselected time out period.

4. The method of claim 1 further comprising skipping the charging of the battery pack while maintaining the battery pack reference voltage whenever a duration of charging the battery pack at the preselected maximum charging current exceeds a preselected time out period.

5. The method of claim 1 further comprising terminating battery pack charging whenever a temperature of the battery pack falls outside a preselected temperature range.

6. The method of claim 1 further comprising terminating battery pack charging whenever the battery pack voltage falls outside a preselected voltage range.

7. The method of claim 5 further comprising restarting the battery charging at the preselected maximum charging current after a preselected pause time whenever the temperature falls outside the preselected temperature range and a maximum number of restarts has not been exceeded.

8. The method of claim 1 further comprising proceeding to the charging of the battery pack at the second preselected charging current reference level whenever a duration of charging the battery pack at the first charging current reference level exceeds a preselected time out period and the battery pack voltage is less than the preselected decision voltage.

9. The method of claim 1 wherein the battery pack reference voltage is determined as a function of battery pack temperature.

10. The method of claim 1 wherein the decision voltage is preselected as a function of battery pack temperature.

11. The method of claim 1 wherein all preselected parameters are chosen on the basis of battery type.

12. The method of claim 1 wherein charging the battery pack at a preselected maximum charging current further comprises:

preselecting a minimum charge time which must expire prior to proceeding with the method regardless of whether a voltage level of the battery pack reaches the battery pack reference voltage.

13. The method of claim 1 wherein during charging the battery pack while maintaining the battery pack reference voltage further comprises;
controlling the charging current such that charging current cannot increase regardless of a voltage level of the battery pack.

14. The method of claim 1 further comprising:
whenever a pack recovery charge is required,
determining a pack recovery charge battery pack reference voltage;
charging the battery pack at a preselected maximum pack recovery charge charging current until battery pack voltage reaches the pack recovery charge battery pack reference voltage;
charging the battery pack while maintaining the battery pack at the pack recovery charge reference voltage until charging current decreases to a preselected pack recovery charge charging current reference level; and
charging the battery pack at the pack recovery charge charging current reference level for a preselected minimum pack recovery charge time period and then continuing charging until a time rate of charge of battery pack voltage reaches a preselected pack recovery charge reference time rate of change.

15. The method of claim 14 wherein a requirement for pack recovery charging is determined by installation of a new battery pack into the vehicle.

16. The method of claim 14 wherein a requirement for pack recovery charging is determined by a service technician.

17. The method of claim 14 wherein the pack recovery charge battery pack reference voltage is greater than the battery pack reference voltage.

18. The method of claim 14 wherein the preselected minimum pack recovery charge time period is greater than the first preselected minimum time period.

\* \* \* \* \*